United States Patent
Brady et al.

(10) Patent No.: US 8,027,648 B2
(45) Date of Patent: Sep. 27, 2011

(54) RADIO FREQUENCY POWER MONITOR

(75) Inventors: Vernon T. Brady, Orlando, FL (US); Thomas R. Wirth, Kissimmee, FL (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 12/453,100

(22) Filed: Apr. 29, 2009

(65) Prior Publication Data

US 2010/0279630 A1   Nov. 4, 2010

(51) Int. Cl.
 *H04B 1/46* (2006.01)
(52) U.S. Cl. .............................. 455/83; 455/78; 455/79
(58) Field of Classification Search ................ 455/83, 455/78, 79
See application file for complete search history.

(56) References Cited

U.S. PATENT DOCUMENTS

| | | | |
|---|---|---|---|
| 4,032,910 A * | 6/1977 | Hollway et al. | 340/600 |
| 4,338,595 A * | 7/1982 | Newman | 340/600 |
| 4,868,795 A | 9/1989 | McDavid et al. | |
| 4,979,232 A * | 12/1990 | Martz et al. | 455/78 |
| 5,109,205 A | 4/1992 | Hart et al. | |
| 5,193,218 A * | 3/1993 | Shimo | 455/80 |
| 5,337,006 A | 8/1994 | Miyazaki | |
| 5,423,081 A | 6/1995 | Thiele et al. | |
| 5,499,000 A * | 3/1996 | Morikawa et al. | 333/104 |
| 5,659,253 A | 8/1997 | Busking | |
| 5,832,373 A | 11/1998 | Nakanishi et al. | |
| 5,956,627 A | 9/1999 | Goos | |
| 6,020,787 A | 2/2000 | Kim et al. | |
| 6,339,702 B1 | 1/2002 | Izumiyama | |
| 6,370,358 B2 | 4/2002 | Liimatainen | |
| 6,498,925 B1 * | 12/2002 | Tauchi | 455/115.1 |
| 6,552,626 B2 * | 4/2003 | Sharpe et al. | 333/104 |
| 6,678,506 B1 | 1/2004 | Dolman et al. | |
| 6,710,651 B2 | 3/2004 | Forrester | |
| 6,957,047 B1 * | 10/2005 | Young et al. | 455/83 |
| 6,980,786 B1 | 12/2005 | Chen et al. | |
| 7,738,842 B2 * | 6/2010 | Yoon | 455/83 |
| 2002/0137481 A1 | 9/2002 | Chen et al. | |
| 2003/0054778 A1 | 3/2003 | Hecht | |
| 2004/0077316 A1 * | 4/2004 | Xiong | 455/78 |
| 2004/0176053 A1 | 9/2004 | Yamashita | |
| 2004/0235436 A1 | 11/2004 | Chao et al. | |
| 2006/0267662 A1 | 11/2006 | Nicholson et al. | |

* cited by examiner

*Primary Examiner* — Yuwen Pan
(74) *Attorney, Agent, or Firm* — Buchanan Ingersoll & Rooney PC

(57) ABSTRACT

An exemplary apparatus for monitoring power of RF energy includes a transmit/receive switch configured to switch an antenna between a transmitter state and a receiver state. The switch includes a diode. The exemplary apparatus can include an output device configured to monitor voltage across the diode of the switch to detect power of RF energy of the antenna. An exemplary method of monitoring power during transmission or reception of a signal can include placing a transmit/receive switch configured to switch an antenna between a transmitter and a receiver into one of a receiver state or a transmitter state. The exemplary method can include detecting voltage across a diode configured as a switching element in the transmit/receive switch to monitor power, and providing an output indicative of the monitored power.

17 Claims, 1 Drawing Sheet

RADIO FREQUENCY POWER MONITOR

FIELD

The subject matter presented herein relates generally to power monitoring.

BACKGROUND

The power output of RADAR, communications transmitters, or transceivers may be monitored to provide built-in test capabilities and to ensure that the power transmission meets a specified system requirement. Such monitoring capabilities may also be used for calibration.

Known transmitters or transceivers that share a port for transmission and reception use a switch to direct the radio frequency (RF) signal from transmit power amplifiers to the port and from the port to receive amplifiers. These systems may involve RF couplers between the transmit/receive switch and the output port to direct a small portion of the RF signal to a detector diode that is connected to an amplifier. For example, U.S. Patent Pub. No. 2004/0077316 to Xiong shows a separate, coupled power detector diode to monitor power levels. Any coupler or device between the transmit/receive switch and the output port reduces the transmit signal by coupling loss as well as insertion loss of the coupler. When the path is used for both transmit and receive signals, the coupler can reduce input power and increase receiver noise, causing degradation in both paths.

SUMMARY

An exemplary apparatus for monitoring power of RF energy includes a transmit/receive switch configured to switch an antenna between a transmitter state and a receiver state, the switch comprising a diode. The exemplary apparatus can include an output device configured to monitor voltage across the diode of the switch to detect power of RF energy of the antenna.

An exemplary method of monitoring power during transmission or reception of a signal includes placing a transmit/receive switch configured to switch an antenna between a transmitter and a receiver into one of a receiver state or a transmitter state. The exemplary method can include detecting voltage across a diode configured as a switching element in the transmit/receive switch to monitor power, and providing an output indicative of the monitored power.

BRIEF DESCRIPTION OF THE DRAWINGS

As will be realized, different embodiments can be implemented in accordance herewith, and the details herein are capable of modification in various respects, all without departing from the scope of the claims. Accordingly, the drawings and descriptions are to be regarded as illustrative in nature and not as restrictive.

Other objects and advantages of the present disclosure will become apparent to those skilled in the art upon reading the following detailed description of exemplary embodiments, in conjunction with the accompanying drawings, in which like reference numerals have been used to designate like elements, and in which:

In the drawings:

FIG. 1 shows an exemplary embodiment of an RF power monitor.

DETAILED DESCRIPTION

Figure 1:
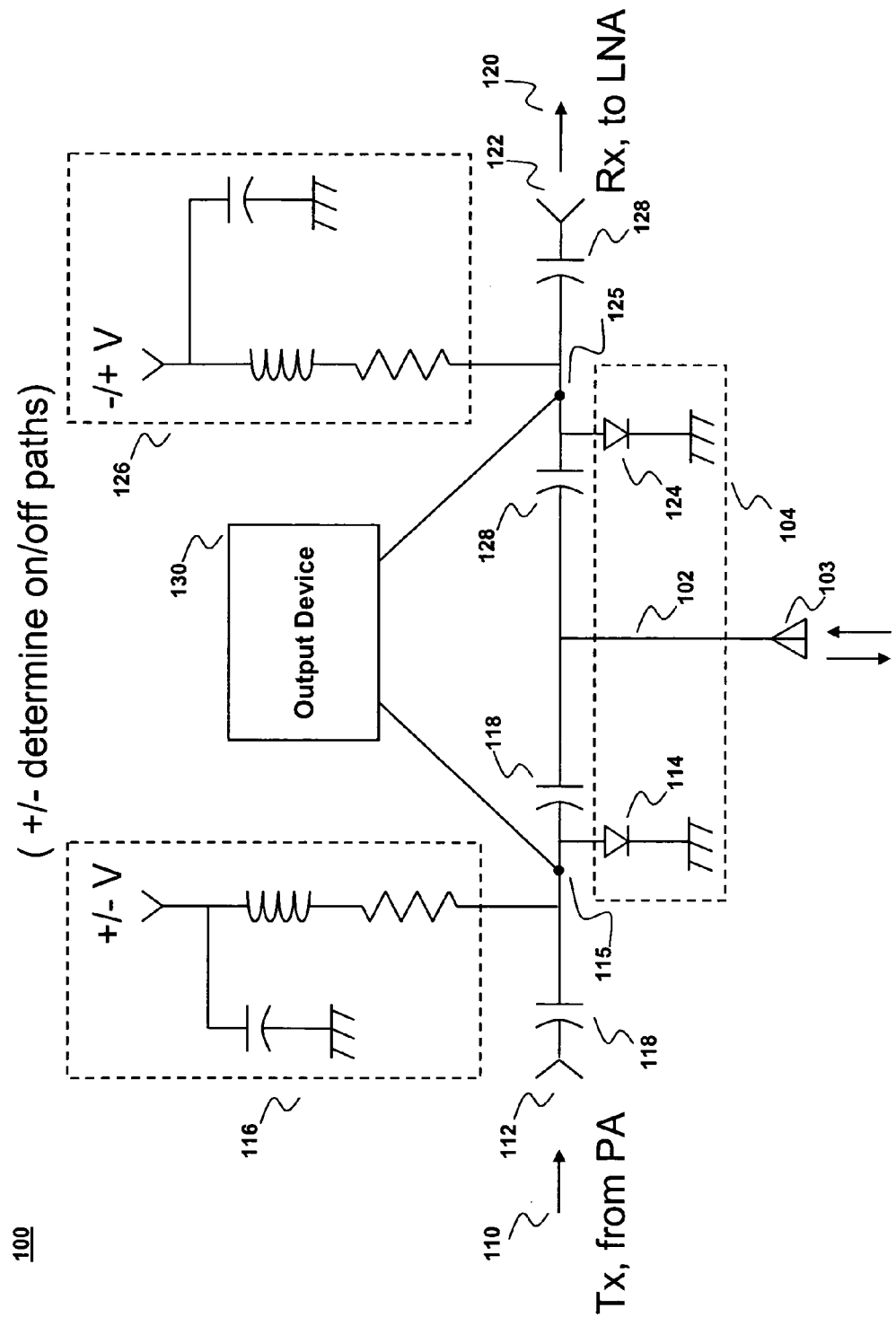

FIG. 1 shows an exemplary embodiment of an apparatus for monitoring power of RF energy. The exemplary embodiment is represented as an RF power monitor 100 in FIG. 1. The RF power monitor 100 can include a transmit/receive switch 104 configured to switch an antenna 103 between a transmitter state and a receiver state. The switch 104 can comprise one or more diodes 114, 124. The antenna 103 can be connected to a common arm 102 to transmit or receive RF energy. The RF power monitor 100 can also include an output device 130 configured to monitor voltage across the diode(s) 114, 124 of the switch 104 to detect power of RF energy of the antenna 103.

The RF power monitor 100 can include a transmit path 110 and a receive path 120. Exemplary embodiments can include multiple transmit paths 110 and/or receive paths 120. Each path can have one or more switches (e.g. diodes) to connect and disconnect the paths to the common arm 102. The output device 130 can then monitor any path that is desired to be monitored. The transmit path 110 represents the path that a signal to be transmitted takes to the common arm 102 from a connection (e.g. input connection) 112. The receive path 110 represents the path that a signal to be received takes from the common arm 102 to the connection (e.g. output connection) 122.

The exemplary RF power monitor 100 includes a diode 114 connected to the transmit path 110 and a diode 124 connected to receive path 120. In other exemplary embodiments, one or more paths can include multiple diodes. The diodes can comprise any known diode or device providing equivalent functionality to a diode. For example, a diode, as used herein, can be a diode-connected transistor. Each diode can include one or more series and/or parallel connected diodes.

The transmit path 110 can include connection 112 that is configured to receive a signal to be transmitted through the common arm 102 to the antenna 103. The connection 112 can be connected to a signal transmitter which can include a power amplifier (PA). The transmit path 110 can be connected to the diode 114 connected between a node 115 and a reference potential (e.g. ground). The node 115 can be surrounded by capacitors 118 to separate the diode 114 (e.g. when DC current flows) from other electrical components such as the diode 124 of the receive path 120. The node 115 can be biased by a biasing network 116. The biasing network 116 can include, for example, a resistor, capacitor, and/or inductor as shown in FIG. 1. Alternatively, the biasing network 116 can include any circuitry which can provide a desired voltage bias to node 115. The desired voltage bias can be a predetermined voltage or controlled by appropriate circuitry.

The receive path 120 can include connection 122 that is configured to transmit a signal received from the antenna 103 received via the common arm 102. The connection 122 can be connected to a signal receiver which can include a Low-Noise Amplifier (LNA). The receive path 120 can be connected to the diode 124 connected between a node 125 and a reference potential (e.g. ground). The node 125 can be surrounded by capacitors 128 to separate the diode 124 (e.g. when DC current flows) from other electrical components such as the diode 114 of the transmit path 110. The node 125 can be biased by a biasing network 126. The biasing network 126 can include, for example, a resistor, capacitor, and/or inductor as shown in FIG. 1. Alternatively, the biasing network 126 can include any circuitry which can provide a desired voltage bias to node 125. The desired voltage bias can be a predetermined voltage or controlled by appropriate circuitry.

The output device 130 can include any device capable of monitoring one or more of the respective voltages across the diodes 114, 124 of the switch 104. For example, the voltage across diode 114 can be measured between node 115 and the ground potential connected to the cathode of diode 114. The voltage across diode 124 can be measured between node 125 and the ground potential connected to the cathode of diode 124. Accordingly, the voltage can be measured without the losses associated with power detection using a coupler. The output device 130 can include a comparator (e.g. a differential amplifier) and/or a display (e.g. an oscilloscope).

In embodiments with a comparator, the comparator can compare the monitored voltage with a reference potential (e.g. ground). In exemplary embodiments with a comparator, the comparator can be directly connected to one or more of the diodes 114, 124 of the switch 104.

Other exemplary embodiments can include an output device 130 connected to monitor one or more of the diodes 114, 124. In addition, output device 130 can include separate devices provided to monitor each of the diodes 114, 124, respectively. For example, diode 114 can be monitored at node 115 and/or diode 124 can be monitored at node 125.

In the exemplary RF power monitor 100, diodes 114, 124 can control the RF path of switch 110 as the actual power detectors. The diodes 114, 124 can also provide switching and monitoring functions as well as rectification of the RF signal. Exemplary embodiments of an RF power monitor 100 can be used for any application desiring cost reduction because of the removal of a diode, a coupler and a load from each path while reducing transmission line length. Advantageously, the exemplary RF power monitor 100 can improve performance by reducing the loss associated with a roundtrip RADAR signal.

In the exemplary embodiment illustrated in FIG. 1, the respective cathodes of diodes 114, 124 are connected to ground. In another embodiment, the orientation of one or more of diodes 114, 124 can be reversed so that the anode(s) of diode(s) 114, 124 is connected to the ground. One skilled in the art would recognize that, in other embodiments, the ground potential can be replaced by any reference potential. A connection to the ground or reference potential can then be used as the reference potential when a comparator is used in output device 130.

According to an exemplary embodiment, power can be monitored by detecting voltage changes due to the RF power on at least one of the diodes 114, 124 in the transmit/receive switch 110. A connection from one or more of the nodes 115, 125 to the respective diodes 114, 124 in the switch 104 to an output device 130, which may be implemented, for example, by using a differential amplifier, can allow for the monitoring of the power, pulse shape, timing, etc. (e.g. in a transmit mode) using an output device, such as an oscilloscope.

An exemplary method of monitoring power during transmission or reception of a signal includes placing a transmit/receive switch 104, which is configured to switch an antenna 103 between a transmitter and a receiver, into one of a receiver state or a transmitter state. The exemplary method includes detecting voltage across a diode (e.g. one or more of diodes 114, 124), which is configured as a switching element in the transmit/receive switch to monitor power. The exemplary method includes providing an output indicative of the monitored power.

In exemplary embodiments, the detecting is performed through a comparator directly connected to the diode. The comparator can, for example, comprise a differential amplifier.

In an exemplary method of monitoring power in a transmitter state, a bias voltage (e.g. from biasing network 116) can be applied to the node 115 to turn off the diode 114. For example, a negative voltage can be applied to reverse bias the diode 114 and inhibit conductivity between the node 115 and a reference potential (e.g. ground). Another bias voltage (e.g. from biasing network 126) can be applied to the node 125 to turn on the diode 124. For example, a positive voltage can be applied to forward bias the diode 124 and allow conductivity between the node 125 and a reference potential (e.g. ground). By applying the bias voltages in the above-described manner, a transmitter state can be obtained where the transmit path 110 is turned on and the receive path 120 is turned off. Therefore, substantially all the transmit power can be transmitted from the connection 112 to the antenna 103 via the common arm 102. Additionally, the transmit power can be reflected by the receive path 120, protecting circuitry (e.g. the LNA) connected to connection 122.

The exemplary method of monitoring power in a transmitter state can include detecting voltage across a diode 114 configured as a switching element in the transmit/receive switch to monitor power and providing an output indicative of the monitored power. The output device 130 can detect voltage across the diode 114 to monitor power. For example, the output device can be directly connected to the node 115 to detect the voltage across the diode 114.

In an exemplary method of monitoring power in a receiver state, a bias voltage (e.g. from biasing network 126) can be applied to the node 125 to turn off the diode 124. For example, a negative voltage can be applied to reverse bias the diode 124 and inhibit conductivity between the node 125 and a reference potential (e.g. ground). Another bias voltage (e.g. from biasing network 116) can be applied to the node 115 to turn on the diode 114. For example, a positive voltage can be applied to forward bias the diode 114 and allow conductivity between the node 115 and a reference potential (e.g. ground). By applying the bias voltages in the above-described manner, a receiver state can be obtained where the receive path 120 is turned on and the transmit path 110 is turned off. Therefore, substantially all the received power can be received from the connection 122 from the antenna 103 via the common arm 102. Additionally, the received power can be reflected by the transmit path 110, protecting circuitry (e.g. the PA) connected to connection 112.

The exemplary method of monitoring power in a receiver state can include detecting voltage across a diode 124 configured as a switching element in the transmit/receive switch to monitor power and providing an output indicative of the monitored power. The output device 130 can detect a voltage across the diode 124 to monitor power. For example, the output device can be directly connected to the node 125 to detect the voltage across the diode 124.

Monitoring of received signals (e.g. from an antenna 103) can be used for detecting signals in an operating band and/or detecting adverse signals in the antenna receive band. The ability of the above-described methods and apparatuses to detect adverse signals can allow for protecting circuits as adverse signals come in. In one example, incoming signals as low as 10 milliwatts (10 dBm) can be detected. If the signals reach a certain level (e.g. 15 dBm or 20 dBm), the switch can be used to blank the incoming signal and provide protection to the circuits. For example, when an adverse signal is received, diodes 114, 124 can be caused to conduct, placing both transmit path 110 and receive path 120 in an off state. This can allow reflection of incoming signals and protection of transmit/receive circuitry (e.g. the LNA).

The above description is presented to enable a person skilled in the art to make and use the systems, apparatuses, and methods described herein, and is provided in the context of a particular application and its requirements. Various modifications to the embodiments will be readily apparent to those skilled in the art, and the generic principles defined herein may be applied to other embodiments and applications without departing from the spirit and scope of the claims. Thus, there is no intention to be limited to the embodiments shown, but rather to be accorded the widest scope consistent with the principles and features disclosed herein.

What is claimed is:

1. An apparatus for monitoring power of RF energy, comprising:
 a transmit/receive switch configured to switch an antenna between a transmitter state and a receiver state, the switch comprising a diode configured as a switching element; and
 an output device configured to monitor voltage across the diode of the switch to detect power of RF energy of the antenna.

2. The apparatus of claim 1, wherein the output device comprises one of a display and a comparator.

3. The apparatus of claim 1, wherein the output device comprises a comparator directly connected to the diode of the switch.

4. The apparatus of claim 1, wherein the diode is connected between the antenna and a reference potential,
 wherein the transmit/receive switch is configured to switch the antenna between a transmitter state and a receiver state by switching the diode to allow and disallow conductivity between the antenna and the reference potential via a first conductive path,
 wherein the receiver state connects the antenna to a receiver via a second conductive path,
 wherein the transmitter state connects the antenna to a transmitter via a third conductive path, and
 wherein the first conductive path is independent of the second conductive path and the third conductive path.

5. The apparatus of claim 4, wherein the reference potential is a ground potential.

6. The apparatus of claim 1, wherein the output device comprises a first terminal and a second terminal, and
 wherein the diode of the switch comprises a first diode connected between the first terminal of the output device and a reference potential, and a second diode connected between the second terminal of the output device and the reference potential.

7. The apparatus of claim 6, wherein an anode of the first diode is connected to the first terminal of the output device, and a cathode of the first diode is connected to the reference potential, and wherein an anode of the second diode is connected to the second terminal of the output device, and a cathode of the second diode is connected to the reference potential.

8. The apparatus of claim 6, wherein the reference potential is a ground potential.

9. The apparatus of claim 6, comprising a first capacitor connected between the first terminal of the output device and the antenna, and a second capacitor connected between the second terminal of the output device and the antenna.

10. The apparatus of claim 6, wherein the output device is configured to monitor a voltage across the first diode by measuring a voltage between the first terminal of the output device and the reference potential, and the monitor a voltage across the second diode by measuring a voltage between the second terminal of the output device and the reference potential.

11. The apparatus of claim 6, wherein the first diode is configured to rectify the power of the RF energy of a signal transmitted from the antenna, and the second diode is configured to rectify the power of the RF energy of a signal received by the antenna.

12. The apparatus of claim 6, comprising a first bias voltage circuit configured to turn on and off the first diode, and a second bias voltage circuit configured to turn on and off the second diode.

13. A method of monitoring power during transmission or reception of a signal, comprising:
 placing a transmit/receive switch, which is configured to switch an antenna between a transmitter and a receiver, into one of a receiver state and a transmitter state;
 detecting voltage across a diode configured as a switching element in the transmit/receive switch to monitor power; and
 providing an output indicative of the monitored power.

14. The method of claim 13, wherein the detecting is performed through a comparator directly connected to the diode.

15. The method of claim 14, wherein the comparator comprises a differential amplifier.

16. The method of claim 13, wherein the diode is connected between the antenna and a reference potential,
 wherein the placing of the transmit/receive switch into one of a receiver state and a transmitter state includes switching the diode to allow and disallow conductivity between the antenna and the reference potential via a first conductive path,
 wherein the antenna is connected to the receiver via a second conductive path,
 wherein the antenna is connected to the transmitter via a third conductive path, and
 wherein the first conductive path is independent of the second conductive path and the third conductive path.

17. The method of claim 16, wherein the reference potential is a ground potential.

* * * * *